United States Patent [19]

Dickenson

[11] 3,964,517
[45] June 22, 1976

[54] FOUR WAY DIVERTER VALVE

[76] Inventor: Harvard G. Dickenson, 649 North Waco, Tulsa, Okla. 74127

[22] Filed: Jan. 14, 1975

[21] Appl. No.: 540,843

[52] U.S. Cl. ............................ 137/625.43; 137/312
[51] Int. Cl.² ........................................ F16K 11/06
[58] Field of Search .......... 137/312, 625.11, 625.18, 137/625.42, 625.43, 625.46

[56] References Cited
UNITED STATES PATENTS

| | | | |
|---|---|---|---|
| 2,893,430 | 7/1959 | Holl | 137/625.42 |
| 3,114,393 | 12/1963 | Vlasic | 137/625.18 |
| 3,633,621 | 1/1972 | Myers | 137/625.11 |
| 3,658,093 | 4/1972 | Kirkwood | 137/625.43 |

Primary Examiner—Henry T. Klinksiek
Attorney, Agent, or Firm—Head, Johnson and Chafin

[57] ABSTRACT

A flow diverter valve having a base with four openings therethrough, the centers of the openings forming the corners of a square, a housing secured to the base providing an enclosure into which the openings in the base communicate, a pair of U-tubes positioned in the housing, the U-tubes being spaced parallel from each other and arranged so that their open ends register with pairs of openings in the base, the U-tubes sealably engaging the base so that the openings in the base communicate with the interior of the U-tubes, and means of rotating the pair of U-tubes so that they communicate with different openings to change the flow paths through the valve.

8 Claims, 3 Drawing Figures

FOUR WAY DIVERTER VALVE

BACKGROUND, SUMMARY AND OBJECTS OF THE INVENTION

In petroleum and chemical refining and processing it is frequently desirable to shift the direction of fluid flow through an apparatus. For this purpose flow diverting valves have been devised. One example of the use of a flow diverting valve is in bi-directional meter prover applications. In bi-directional meter proving an elongated cylindrical metering chamber is arranged in series connection with a meter. A piston in the metering chamber is moved by flow of fluid through the meter. By comparing the indicated flow volume registered by the meter with the volume displaced by the piston as it is moved by the fluid flow within the metering chamber the accuracy of the meter can be verified and the meter calibrated. The most expeditious means of calibrating a meter is to cause the fluid which flows through the meter to move the piston in the metering chamber in first one direction and then in the other. To do this requires that the fluid flow be diverted after it leaves the meter to flow first in one direction through the metering chamber and then in the opposite direction.

While others have provided diverter valves to accomplish the above purpose, most of the valves in present use are relatively expensive to manufacture in that they require special castings, machining, and so forth. The present invention is directed towards a four way diverter valve characterized by simplicity, effectiveness, and particularly, by the fact that it can be constructed from readily available components.

It is therefore an object of this invention to provide an improved fluid flow diverter valve.

More particularly, an object of this invention is to provide a fluid flow diverter valve which can be constructed from readily available components, primarily by welding, and in a manner requiring only a minimum amount of machining.

These general objects as well as other and more specific objects of the invention will be fulfilled in the following description and claims, taken in conjunction with the attached drawings.

DESCRIPTION OF VIEWS

DETAILED DESCRIPTION

Figure 1:
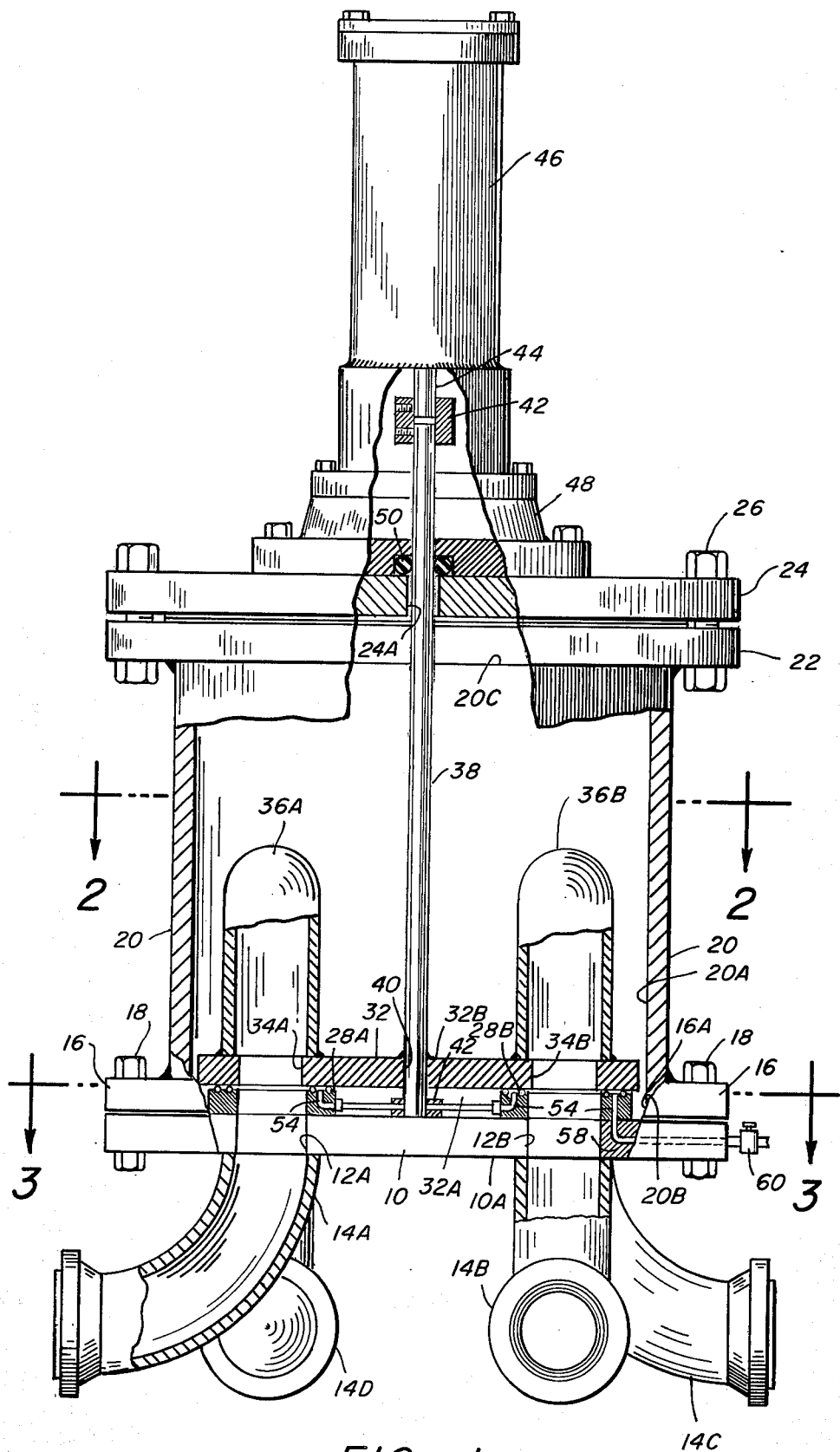
FIG. 1 is an elevational side view of a valve incorporating the principles of this invention, the valve being shown partially cut away to expose interior components.

Referring to the drawings and first to FIG. 1 an embodiment of a valve incorporating the principles of the invention is illustrated. The valve includes a base plate 10 which has openings 12A through 12D therein. Shown welded to the bottom surface 10A of the base plate are 90° ells identified by numerals 14A through 14D. The ells 14A through 14D communicate with the openings 12A through 12D. The ells 14 form means by which piping can be connected to the valve.

Removably attached to the base plate 10 is a base ring 16. While the valve is not so limited, the base plate 10 is preferably circular and in like manner the base ring 16 is circular and of equal diameter. The base ring 16 is removably attached to the base plate 10, such as by means of bolts 18.

Secured to the base ring 16, such as by welding, is a tubular housing portion 20. The diameter of the interior 20A of the housing is preferably substantially equal to the internal diameter 16A of ring 16. The tubular housing portion 20 may be formed such as of a length of pipe, the lower end 20B being welded to the ring 16 as above indicated.

The upper ends 20C of the tubular housing portion 20 is closed by an upper ring 22 and an upper plate 24. Upper ring 22 is welded to the upper end 20C of the housing. Upper plate 24 is removably attached to upper ring 22, such as by means of bolts 26. Upper plate 24 has an opening 24A, the purpose of which will be described subsequently.

Surrounding each opening 12A through 12D of the base plate 10 is a seal ring, the seal rings being indicated by the numbers 28A through 28D. The seal rings each have an internal diameter substantially equal to and in registry with the diameter of the openings 12A through 12D. The upper end of each of the seal rings 28 is provided with two spaced apart circumferential seals, each inner seal being indicated by numeral 30A and each outer seal by the numeral 30B.

Positioned within the body tubular housing portion 20 is a support plate 32. The external diameter of the support plate is less than the internal diameter of the housing 20. Support plate 32 has four openings 34A through 34D, the centers of which are the same distance apart as the openings 12A through 12D of the base plate 10 and in sealed engagement with the seal 30A and 30B in each of the seal rings 28A.

Secured to the upper surface 32B of the support plate is a pair of 180° U-tube members, indicated by the numeral 36A and 36B.

Support plate 32 is positioned by means of a shaft 38 axially positioned within the tubular housing portion 20. Shaft 38 extends through an opening 24A in support plate 24. The lower end of shaft 38 is rotatably supported in a bushing 42 which is secured to base plate 10.

The upper portion of shaft 38 is connected by means of a coupling 42 to the shaft 44 of a valve operator 46. Intermediate the upper plate 24 and the operator 46 is a seal plate 48 which retains a seal 50 against the rotatable shaft 38 to prevent leakage of fluid from inside the housing.

Operator 46 is shown illustrated as being an electric motor, which will normally be a gear motor, the gear portion not being shown. However, this is by way of example only as the valve may be operated manually, hydraulically, pneumatically, electrically, or otherwise. The method of operation of the valve, that is the method of rotation of shaft 38, is not a part of the invention. Valve operators are well known in the art and many commercial valve operators may be readily applied to the valve of this invention.

In addition, an improved method of operation of the valve may employ an arrangement wherein shaft 38 is slightly axially upwardly displaced prior to the rotation of support plate 32 from one position to another and, when the plate is in the proper position the shaft 38 may be forced downwardly to force the plate into sealed engagement with seal 30A and 30B. This procedure avoids frictional engagement of the seals 30A and 30B with plate 32 as it is being rotated, to reduce the wear on the seals.

OPERATION

Figure 2:
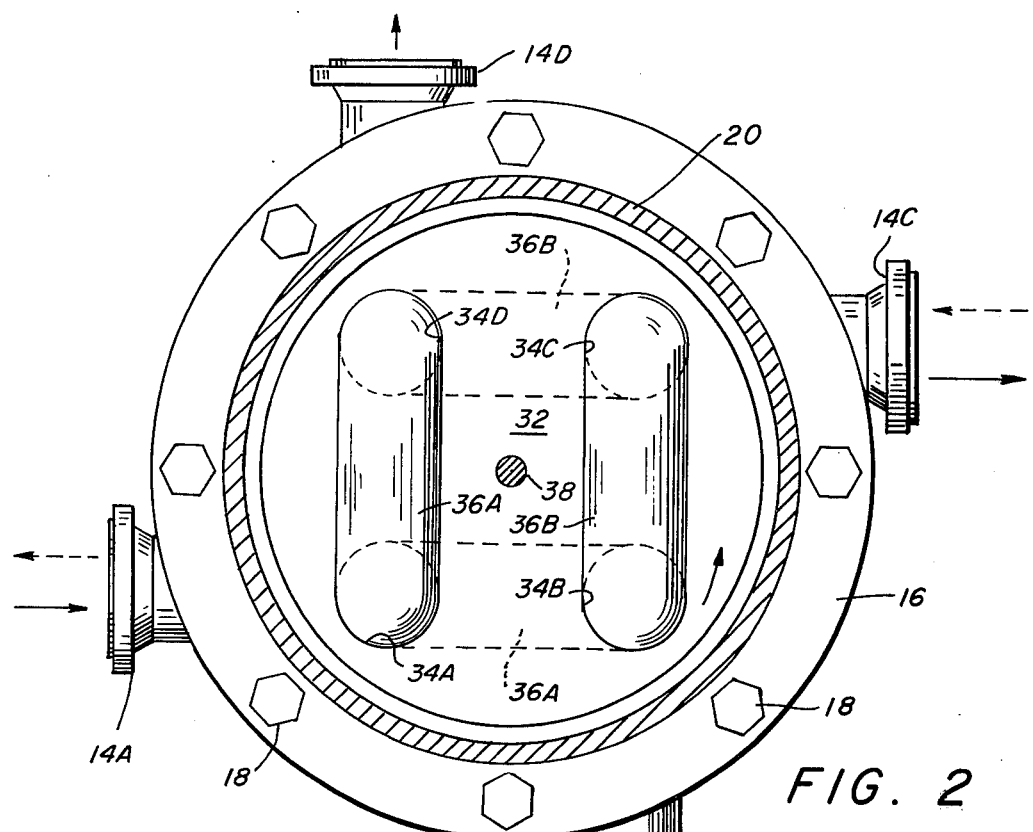
FIG. 2 is a cross-sectional view taken along the line 2—2 of FIG. 1.
Figure 3:
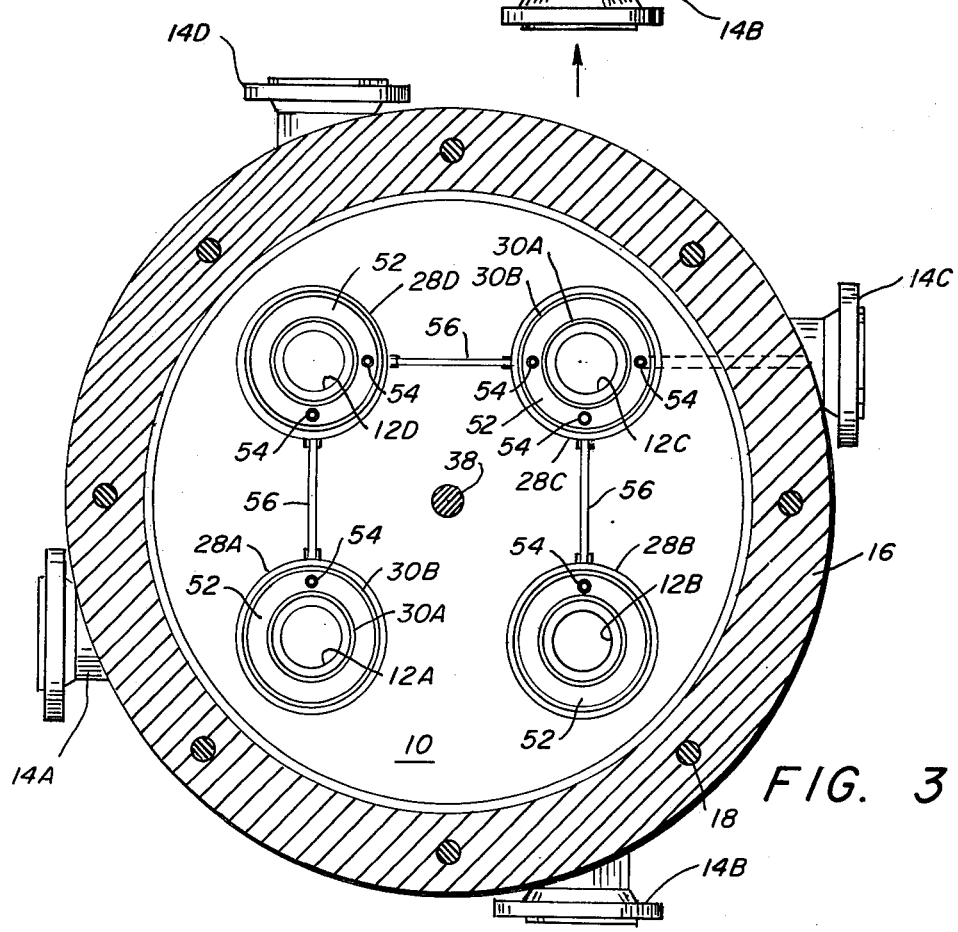
FIG. 3 is a cross-sectional view taken along the line 3—3 of FIG. 1.

The operation of the valve will be described as it is specifically applied to a meter prover system, it being understood that this is by way of example only and not a limitation of the use to which the valve may be put. Referring to FIGS. 1 and 2, assume that a closed loop bi-directional meter prover barrel is connected between ells 14A and 14C; that ell 14B is an inlet opening, and that ell 14D is an outlet opening of the valve. With the support plate 32 and U-tubes in the position shown in solid outline in FIGS. 1 and 2, fluid flows into ell 14B, up through opening 12B in base plate 10, through opening 34B in support plate 32, through U-tube 36B, through ell 14C. The fluid flow continues through the meter prover barrel (not shown) and enters the valve again through ell 14A where it flows upwardly through the base plate and support plate, through U-tube 36A out through support plate 32 and base plate 10 and through outlet ell 14D.

When support plate 32 is rotated 90° U-tubes 36A and 36B align with different openings in the base plate 10. After rotation of the support plate 90° counterclockwise, the position of the U-tubes 36A and 36B will appear as shown in dotted outline in FIG. 2. Fluid flowing through ell 14B will pass through U-tube 36A and out ell 14A, returning into the valve through ell 14C, through U-tube 36B, and out ell 14D. Thus, ell 14B remains an inlet port to the valve and ell 14D an outlet port, and by rotating the support plate 90° in either direction the direction of flow through the meter prover barrel connected between ells 14A and 14C can be reversed.

It can be seen that the housing of the valve, including the tubular housing portion 20 and the upper and lower closure portions, does not normally function as a conduit for fluid flow. The housing serves only to prevent leakage of fluid when the valve is being switched from one position to another.

As previously indicated, an important aspect of the valve of this invention is that it can be constructed from readily available components without requiring expensive castings and machining. The ells, plates, rings, tubular housing portion, U-tubes, shafts and so forth are all standard, readily available components utilized for other industrial purposes. The main steps necessary to fabricate the valve of this invention from such readily available components is that of drilling openings as required and welding the parts together. About the only area wherein machining may be required is to provide the grooves in the faces of the seal rings 28A through 28D to receive the inner and outer seals 30A and 30B.

LEAK DETECTION

When the valve of this invention is used for controlling the direction of fluid flow through a meter prover it is important that no leakage occurs within the valve; that is, that no fluid flowing into inlet ell 14A flows through outlet ell 14D without passing first through the meter prover connected between ells 14A and 14C. As previously stated, each of the seal rings 28 has an inner seal 30A and an outer seal 30B. The space between the inner and outer seal is designated by the numeral 52. By means of openings 54 drilled in the seal rings, communication is provided with the space 52 between the seals. The openings 54 are connected together by means of small diameter conduits 56. One of the seal ring passages 54 communicates with a passageway 58 formed in the base ring 10. In this way, all of the spaces 52 between the seals connect to the exterior of the valve through base passageway 58. A small test valve 60 selectably closes passageway 58. When the diverter valve is in a condition wherein fluid is flowing through it to a meter prover barrel the test valve 60 may be manually opened. If any leakage is occurring within the valve fluid will flow through one of the spaces 52 between the seals and through a passage 54 and conduit 56, out through base passageway 58 and test valve 60 to thereby be detected. As long as all fluid flow through the valve is without leakage, no fluid will appear at test valve 60. In such a way, the integrity of the valve can be readily checked at all times. In addition to the use of the small manually operated test valve 60, which is shown for purposes of example only, it can be seen that pressure gauges, pressure sensing switches, and other apparatus may be utilized to indicate leakage within the valve.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed:

1. A flow diverter valve comprising:
   a base having four openings, the centers of the openings forming the corners of a square;
   a housing sealably secured to said base providing an enclosure into which said openings in said base communicate;
   a pair of uninterrupted circumferential spaced apart seals surrounding each of said base openings, each pair of seals providing a space therebetween;
   a conduit means connecting the space between each pair of seals to the exterior of the valve;
   a support plate supported within said housing parallel with and adjacent said base, said support plate having four openings therethrough on centers equivalent with said base openings, said support plate being rotatable relative to said base whereby said opening in said support plate may be sealably registered with said base openings;
   a pair of U-tube members positioned in said housing in spaced paralleled relationship, each U-tube member having open ends registering with adjacent pairs of openings in said support plate whereby each said opening in said base communicates with the interior of a said U-tube member; and
   means of rotating said support plate whereby said opening therein may be registered with different of said base openings.

2. A flow diverter valve according to claim 1 wherein said base is in the form of a plate having an upper surface enclosed by said housing, and including:
   a seal ring secured to said base plate surrounding each of said openings therethrough, said seal rings being sealably engaged by said support plate, said pairs of seals surrounding each of said base openings being positioned in the seal rings.

3. A flow diverter valve according to claim 1 wherein said means of rotating said support plate includes:
   a shaft affixed centrally to said support plate and extending normal thereto; and
   means supported by said housing to rotate said shaft.

4. A flow diverter valve according to claim 1 wherein said base is in the form of a circular plate and wherein said housing includes:
   a base ring of external diameter substantially equal to said base plate;
   a tubular housing portion secured at the first end to said base ring, the internal diameter of the tubular housing portion being substantially the same as the internal diameter of said base ring;
   means of removably securing said base ring to said base plate; and
   means closing the second end of said tubular housing portion.

5. A flow diverter valve according to claim 4 wherein said means of closing said second end of said tubular housing portion includes;
   a closure ring secured to the second end of said tubular housing member, the internal diameter of said closure ring being substantially equal to the internal diameter of said tubular housing portion;
   a closure plate of external diameter substantially equal the external diameter of said closure ring; and
   means of removably attaching said closure plate to said closure ring.

6. A flow diverter valve comprising:
   a circular base plate having four openings, the centers of the openings forming the corners of a square;
   a base ring of external diameter substantially equal to the external diameter of said base plate;
   means of removably securing said base plate to said base ring;
   a tubular housing portion secured at the first end to said base ring, the internal diameter of said tubular housing portion being substantially equal the internal diameter of said base ring;
   means closing the second end of said tubular housing portion;
   a support plate positioned within said tubular housing portion, the support plate being parallel with and adjacent said base plate, the external diameter of the support plate being less than the internal diameter of said base ring and tubular housing portion, the support plate having openings therethrough on centers equidistant with said openings in said base plate, said support plate being rotatable relative to said base plate whereby said openings in said support plate may be sealably registered with said base plate openings;
   a pair of 180° U-tube members positioned in said housing in spaced, paralleled relationship, each said U-tube member having open ends secured to said support plate on the side thereof opposite the base plate, the U-tube members being aligned with said support plate openings;
   a pair of uninterrupted circumferential spaced apart seals surrounding each of said base plate openings, each pair of seals providing a space therebetween; and
   a conduit means connecting the space between each pair of seals to the exterior of the valve;
   a shaft centrally secured to said support plate and extending perpendicularly thereof, said shaft extending sealably through said closed end of said tubular housing portion, whereby said shaft may be rotated by means externally of said housing portion to thereby rotate said support ring to align said U-tube members with different openings in said base plate.

7. A flow diverter valve according to claim 6 including:
   a seal ring secured to said base plate surrounding each of said openings, said seal rings being sealably engaged by said support plate, said pairs of seals surrounding each of said base plate openings being positioned in the seal rings.

8. A flow diverter valve according to claim 6 wherein said means of closing said second end of said tubular housing portion includes:
   a closure ring secured to the second end of said tubular housing member, the internal diameter of said closure ring being substantially equal to the internal diameter of said tubular housing portion;
   a closure plate of external diameter substantially equal the external diameter of said closure ring; and
   means of removably attaching said closure plate to said closure ring.

* * * * *